(12) United States Patent
Weaver et al.

(10) Patent No.: US 7,248,052 B2
(45) Date of Patent: *Jul. 24, 2007

(54) ELECTRIC POWER GRID INDUCED GEOPHYSICAL PROSPECTING METHOD AND APPARATUS

(76) Inventors: W. Barry Weaver, 3121 Las Palmas, Houston, TX (US) 77027; Roy K. Warren, 11322 Woodedge Dr., Houston, TX (US) 77065

( * ) Notice: Subject to any disclaimer, the term of this patent is extended or adjusted under 35 U.S.C. 154(b) by 185 days.

This patent is subject to a terminal disclaimer.

(21) Appl. No.: 10/446,322

(22) Filed: May 28, 2003

(65) Prior Publication Data

US 2004/0239330 A1   Dec. 2, 2004

(51) Int. Cl.
    *G01V 3/00* (2006.01)
(52) U.S. Cl. .................... 324/334; 324/323
(58) Field of Classification Search ............. 324/348, 324/347, 354, 357, 359, 3, 6, 67, 323, 334, 324/337, 344, 345, 349, 350; 702/5–7, 11–16, 702/115; 367/73, 25; 342/22, 459
See application file for complete search history.

(56) References Cited

U.S. PATENT DOCUMENTS

| | | | | |
|---|---|---|---|---|
| 3,866,111 A | * | 2/1975 | Warren | 324/334 |
| 4,130,791 A | * | 12/1978 | Slough et al. | 324/326 |
| 4,276,619 A | * | 6/1981 | Rickenbacker | 367/13 |
| 4,295,213 A | * | 10/1981 | Mifsud | 367/41 |
| 4,507,611 A | | 3/1985 | Helms | |
| 4,646,277 A | | 2/1987 | Bridges et al. | 367/191 |
| 4,686,475 A | | 8/1987 | Kober | |
| 4,751,687 A | * | 6/1988 | Christensen | 367/22 |
| 4,825,165 A | | 4/1989 | Helms | |
| 4,831,331 A | * | 5/1989 | De et al. | 324/338 |
| 4,835,473 A | * | 5/1989 | Bostick, Jr. | 324/357 |
| 4,939,460 A | | 7/1990 | Patla et al. | 324/303 |
| 5,148,110 A | | 9/1992 | Helms | |
| 5,210,691 A | * | 5/1993 | Freedman et al. | 702/7 |
| 5,266,799 A | | 11/1993 | Steinitz et al. | 250/253 |
| 5,625,348 A | * | 4/1997 | Farnsworth et al. | 340/690 |
| 5,777,478 A | | 7/1998 | Jackson | |
| 6,087,833 A | | 7/2000 | Jackson | |
| 6,414,492 B1 | * | 7/2002 | Meyer et al. | 324/344 |
| 6,483,309 B1 | * | 11/2002 | Gripshover et al. | 324/331 |
| 6,661,235 B2 | * | 12/2003 | Rokunohe et al. | 324/536 |

(Continued)

OTHER PUBLICATIONS

McCollor et al., "An E.M. Method For Earth Resistivity Measurements Using Power Line Harmonic Fields", 1983, Journal of Geomagnetism and Geoelectricity, vol. 35, No. 1, pp. 221-243.*

(Continued)

*Primary Examiner*—Edward Lefkowitz
*Assistant Examiner*—David M Schindler
(74) *Attorney, Agent, or Firm*—Wong, Cabello, Lutsch, Rutherford & Brucculeri, LLP (57) ABSTRACT

A geophysical prospecting method and apparatus that utilizes the harmonics and sub harmonics waves induced into the earth by the electric power grid. The amplitude-frequency data are converted to amplitude-depth data and further converted to a differential curve. The resulting differential curve is compared to known patterns of the interested geological features, such as hydrocarbon reservoir, to identify whether the features exist and at what depth such geological features lie.

7 Claims, 6 Drawing Sheets

U.S. PATENT DOCUMENTS

| | | | |
|---|---|---|---|
| 6,664,788 B2 * | 12/2003 | Hornbostel et al. | 702/14 |
| 6,696,839 B2 | 2/2004 | Ellingsrud et al. | 324/337 |
| 6,754,590 B1 * | 6/2004 | Moldoveanu | 702/14 |
| 2002/0196149 A1 | 12/2002 | Halleck et al. | 340/573.1 |
| 2004/0090234 A1 | 5/2004 | Macune | 324/337 |

OTHER PUBLICATIONS

Risk et al., "Use of magnetotelluric signals from 50 Hz power lines for resistivity mapping of geothermal fields in New Zealand", 1999, Geophysical Prospecting, vol. 47 Issue 6, pp. 1091-1104.*

Dobrin, et al. "*Introduction to Geophysical Prospecting—Fourth Edition*" McGraw-Hill Book Company 1988, pp. 3-8.

Lytle, et al. "*Using the Natural-Frequency Concept in Remote Probing of the Earth*" Radio Science, vol. 11, No. 3, pp. 199-209, Mar. 1976.

Pride, et al. "Governing Equations for the Coupled Electromagnetics and Acoustics of Porous Media" J. Acoust. Soc. Am. 100 (3), Sep. 1996.

* cited by examiner

PROCESSING

| | |
|---|---|
| BUILD A POWER SPECTRUM USING A STACK OF 16 TIME DOMAIN FILES | 300 |
| USING THIS POWER SPECTRUM, BUILD SIX FILTERED FILES | 302 |
| CONVERT FREQUENCY-AMPLITUDE DATA TO DEPTH-AMPLITUDE DATA | 304 |
| UNFILTERED FILE DIVIDED BY FILTERED FILE NEAR DEPTH OF INTEREST | 306 |
| RATIO IS SAVED FOR FINAL PLOT AND ANALYZED | 308 |

PROCESSING

RELATIVE AMPLITUDE VS DEPTH

CROSS SECTIONS ARE MADE USING MULTIPLE SITES IN PROFILE OR 3D GRID

WITH POWER SPECTRUM AND PAY ZONE ANALYSIS    320

ELECTRIC POWER GRID INDUCED GEOPHYSICAL PROSPECTING METHOD AND APPARATUS

CROSS-REFERENCE TO RELATED APPLICATIONS

BACKGROUND OF THE INVENTION

1. Field of the Invention

This invention relates to the investigation of the earths subsurface, and in particular to methods and devices that utilize electromagnetic waves produced by power line harmonics to facilitate detailed subsurface investigations.

2. Description of the Related Art

There are numerous methods used to investigate the subsurface of the earth. The most widely used methods include seismic, gravity, magnetic, electrical, and electromagnetic. Electromagnetic techniques can be broadly divided into two categories based on the source of the electromagnetic waves (Dobrin et al). Natural field sourced methods include magnetotellurics (MT) and audio frequency MT (AMT). Artificially controlled source methods include transient soundings (TEM), ground penetrating radar, and controlled source audio magnetotellurics (CSAMT). These methods all have resolution and operational characteristics, which result in limited applicability and/or high costs.

It is desirable to have methods and devices that can be used in areas where the existing methods or equipment are not suitable technically, economically or logistically. It is desirable to have methods and devices that can have wide applicability, and are simple and inexpensive to operate, and provide high resolution.

References

Introduction to Geological Prospecting, Fourth Edition, Milton B. Dobrin and Carl H. Savit, McGraw-Hill, 1988.

"Using the natural-frequency concept in remote probing of the earth", R. J. Lytle and D. L. Lager, Radio Science, Volume 11, Number 3, pages 199-209, March 1976.

"Governing equations for the coupled electromagnetics and acoustics of porous media", S. R. Pride, Phys. Rev., B50, pages 15678-15696, 1994.

BRIEF SUMMARY OF THE INVENTION

The present invention discloses improved methods and apparatus for investigating the geologic and geophysical properties of the subsurface of the earth. One of the methods takes advantage of the secondary harmonic frequencies that are induced into the earth by electromagnetic waves from the electric power line grid. The method utilizes the resonant tuning of these secondary harmonic frequencies between the air/earth interface and the various subsurface geologic boundaries. The secondary harmonic frequencies that are tuned to subsurface boundaries are measured at the surface of the earth and thereafter interpreted to determine the geologic and geophysical properties. The wavelengths associated with these various frequencies are related to the depth of the various geologic boundaries. In addition, through further time/frequency domain data processing, a direct indication of the presence or absence of an interested substance, e.g. hydrocarbons, water, minerals, is deciphered.

These methods greatly reduce the costs for acquiring and interpreting the subsurface geology of the earth at very high resolution.

A simple device that utilizes these methods is also disclosed.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

The present invention utilizes the electromagnetic waves from the power line grid as an electromagnetic source for investigating the subsurface geological structure. The electric power grid induces electromagnetic waves into the earth. These electromagnetic waves consist of 60-hertz waves (50 hertz in many areas of the world) plus a rich array of harmonics and sub harmonics. These secondary harmonics include multiples of 60, 30, and 15 hertz (50, 25, 12.5 hertz in many areas of the world) and extend up to frequencies in the tens of kilohertz. It is believed that these continuous sources propagate to depth with the help of energy transfer of electromagnetic to acoustic and acoustic to electromagnetic between multiple stratigraphic layers (Pride). As these waves propagate they encounter various geologic boundaries. Those boundaries having dielectric and/or conductivity contrast reflect a portion of the secondary harmonic waves back to the air/earth interface. With continuous sourcing from the electric power grid, the secondary harmonics resonate between subsurface boundaries and the air/earth interface (Lytle et al). In this manner, the secondary harmonics become organized with the distance between various subsurface boundaries and the air/earth interface. This distance is normally thought of as the depth to the subsurface boundary. At resonance, the depth to the subsurface boundary is related to the wavelength of the secondary harmonic by the following formula:

$$\lambda = 2 \cdot d \qquad \text{Formula 1}$$

Where $\lambda$ is the wavelength of the secondary harmonic and d is the depth to the subsurface boundary.

Figure 1:
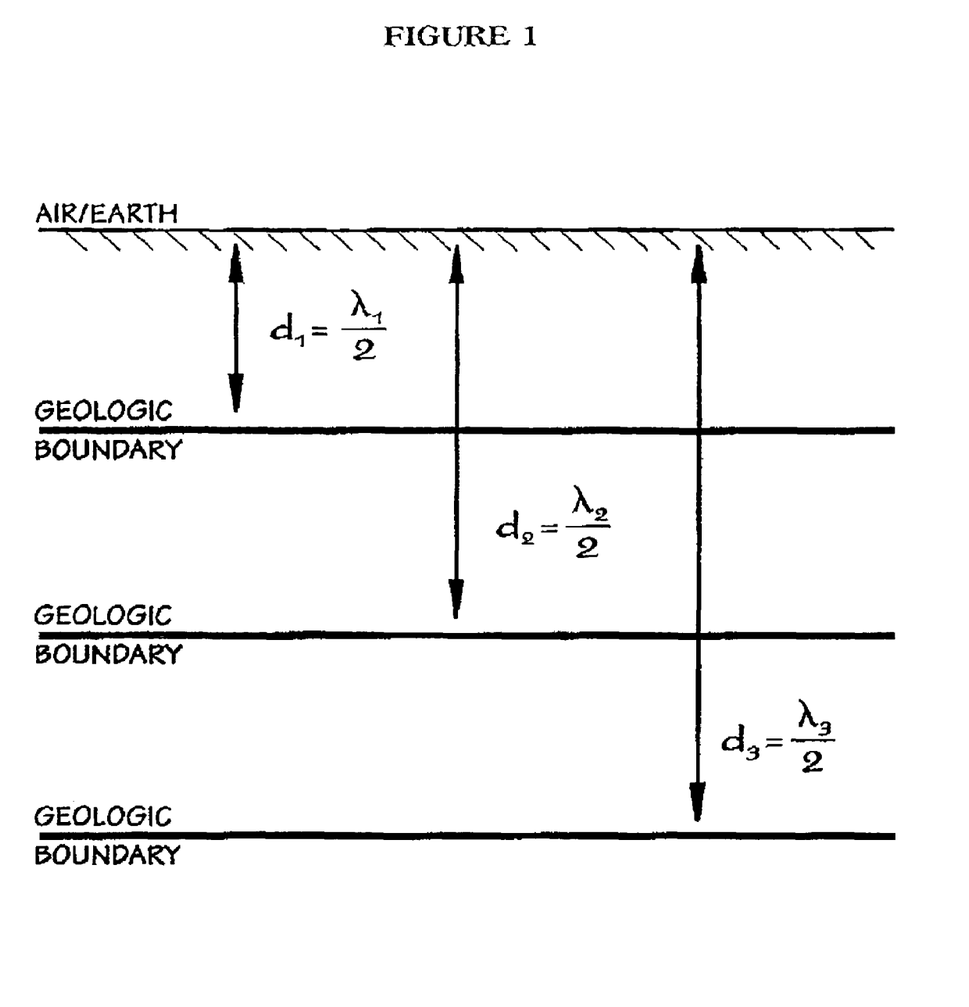
FIG. 1 is a schematic depiction of resonant tuning in the subsurface of the earth.

This relationship is illustrated in FIG. 1. Each subsurface geologic boundary is primarily resonant with a particular wavelength and therefore there exists an organization of the wavelengths with depth. For example, $d_1 = \lambda_1/2$, similarly, $d_2 = \lambda_2/2$, $d_3 = \lambda_3/2$.

The wavelength λ is related to frequency f as follows:

$$\lambda = \frac{v}{f}$$ Formula 2

Where v is the phase velocity of the electromagnetic wave in the earth. The resonance between geologic boundaries within the earth and the air/earth interface can be characterized by the following equation:

$$d=(k/f)+b$$ Formula 3

Where k is a form factor that is dependant on phase velocity and local conditions; d and f are depth to a particular boundary, and resonant frequency, respectively; and b is a calibration constant. The numerator of the above equation can be determined empirically by calibration with known subsurface geologic boundaries. A careful tie to a representative well log is normally useful for an area of many square miles. A depth accuracy of plus or minus 25 feet or better can be achieved depending on depth. For hydrocarbon exploration, the depth between about 1000 ft to 20,000 ft is the range of most interest. The measured electromagnetic waves are typically in the audio frequency range. Typically, k is between 10 to 35 million, and b is between plus or minus 500.

Figure 2:
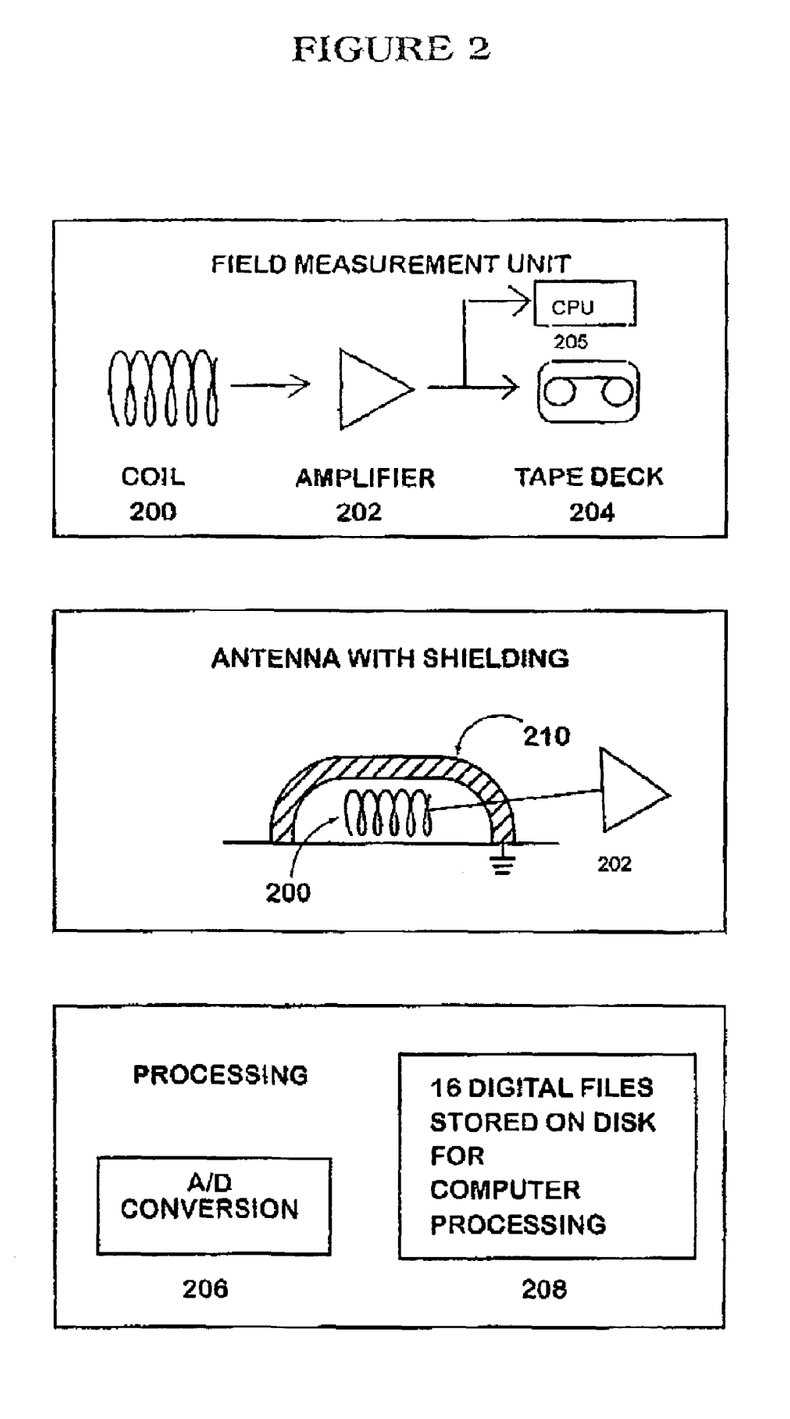
FIG. 2 depicts the instrumentation and procedures used to acquire and process data.
Figure 3:
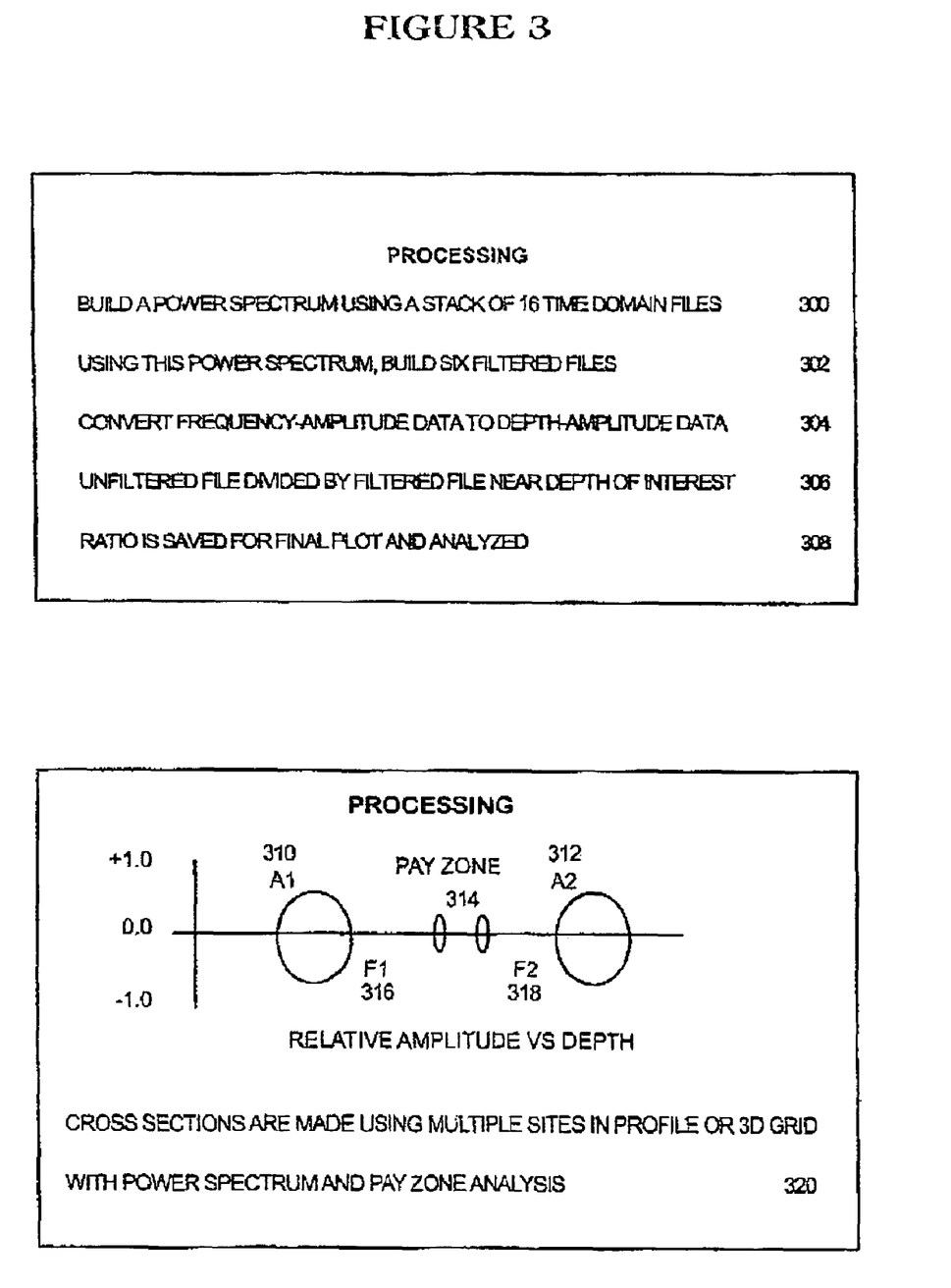
FIG. 3 lists the processing steps and depicts the features required for the identification of hydrocarbon zones.

FIGS. 2 and 3 present a simplified representation of one of the several embodiments of the apparatus and methods suitable for the purposes of the present invention. FIG. 2 depicts the procedures required for acquisition of data in the field. FIG. 2 also shows the first steps that may be employed for processing the data. A field measurement unit may comprise a coil 200, an amplifier 202 and a tape deck 204. The field measurement may also have a processing unit, which may have an A/D conversion unit and disks for storing digital files for computer processing. The coil 200 is used to pick up the electromagnetic waves from subsurface earth. The coil 200 may consist of a number of turns of fine wire on a metal core. The voltage picked up by coil 200 is amplified by amplifier 202 and the output is passed to tape deck 204. The time domain data is collected for a predetermined period of time, for example, for five or more minutes. Several sets of time domain data may be collected. Data processing may start with A/D conversion 206. The sample rate that is selected depends on the need. In one embodiment, a rate of 48,000 samples per second is used. The digitized time-domain data is built into a data file. Several data files, typically 16 data files are built and stored on a disk for further computer processing 208. Complete data processing is possible at the field location or later at the office.

To avoid noise or interference from sources above ground, an electric shield 210 may be used. Electromagnetic waves from underground sources can reach the coil 200 to be recorded by the field measurement unit. Electromagnetic waves from above ground sources are rejected at the electric shield 210 and cannot reach the coil 200. The measurements may be made at the surface of the earth as in the preferred embodiment, however; these measurements could also be made from below the surface of the earth and/or bodies of water.

To further reduce spurious noise from other sources that can distort an ideal pattern thus hindering interpretation, a number of measured files may be stacked to obtain an average measurement. Stacking files reduces spurious noise and thus it may be included as a processing step. Beyond this step, filtered and unfiltered files are cross-correlated to test for the ideal response. A filtered file is developed using a series of low pass and band pass procedures in either the TIME-DOMAIN or FREQUENCY-DOMAIN. Cutoff frequencies to define the filters are applied to the depth formula described above.

FIG. 3 lists the processing steps and depicts the pattern for a hydrocarbon pay zone. The 16 time-domain files are converted to the frequency domain and are stacked to build a power spectrum at step 300. Once in the frequency domain, an amplitude-frequency chart may be converted to an amplitude-depth chart using formula 3. Several transforms may be used to make the spectrum, but the Maximum Entropy Method (MEM) is preferred. Besides the MEM transformation in the preferred embodiment, other conventional processing such as the FFT or WAVELET transforms may be used to produce the power spectrum.

In one embodiment, where MEM is used to build the power spectrum curves, one of the 16 time-domain files is selected. For each time-domain file, one base power spectrum (unfiltered file) and several secondary power spectra (filtered files) are generated. Each power spectrum is generated with a number of coefficients. This number for base spectrum is n (the largest coefficient), and the number for secondary spectrum m is smaller. The n is a number that is less than the total number of data points available, between ⅛ and ½ of the total number of data points. Typically, n is selected to be about 25% of the total number of data points in the amplitude-depth (amplitude-frequency) chart. In a typical implementation, the total data point may be 16,000 and n is selected to be about 4,000. The smallest m is between about ⅓ to ¾ of n. In the above example where n is 4000, the smallest m may be 2800. With large MEM coefficient, the resolution of the power spectrum is sharper. With smaller MEM coefficient, the resolution of the power spectrum is lower, or the spectrum curve is smoother. In a typical implementation, the six secondary power spectra may be generated. In the above example, the MEM coefficient for secondary power spectra may be 2800, 3000, 3200, 3400, 3600 and 3800. More or fewer secondary power spectra may be generated and different MEM coefficients may be used. The MEM coefficient for the secondary power spectra will affect the resulting derivative curve as discussed below and should be adjusted by trial and error. For each one of the 16 time domain files, a set of one base power spectrum and six secondary power spectra may be generated. Sixteen (16) sets of power spectra are generated. Each corresponding power spectrum in the sixteen sets may be stacked (summed) to generate a single power spectrum. Stacking is not required, but it is beneficial because it further reduces noise. Therefore, after stacking one set of power spectra remains, with one base power spectrum and six secondary power spectra. This is shown in FIG. 3 as step 302.

In the step 304, frequency in power spectrum is converted to depth using the formula 3. All seven power spectra (one base and six secondary) are converted from frequency-amplitude to depth-amplitude.

In the step 306, a depth of interest is selected. The segments of power spectra are selected where the depths are close to the depth of interest. Typically, one segment of several hundred feet deep is investigated at a time. In the example shown in FIG. 5, within the segment, the base power spectrum is divided by a secondary power spectrum to generate a derivative curve. The resulting derivative curve may reveal a certain pattern. With six secondary power spectra, there can be six derivative curves. Different derivative curves may reveal the pattern differently, some are better than others. Usually six derivative curves are enough to reveal a pattern if there is one. Adjusting the MEM coefficients of the secondary power spectrum as discussed above may improve the particular pattern. The differential curve may be plotted in step 308 for ease of reading. Comparing the resulting plot and the characteristic pattern for hydrocarbon can reveal whether there is a hydrocarbon deposit at the depth of interest or its vicinity. The pattern for hydrocarbon is shown in FIG. 3 and later in FIG. 5.

To investigate whether there are hydrocarbon deposits at another depth, one can change the depth of interest and repeat the step 306.

A characteristic pattern as shown in FIG. 3 is for identifying hydrocarbon deposits in the earth's subsurface. The relative amplitude versus depth plot gives large circular shapes above "A1" 310 and below "A2" 312 the zone of interest. The pay zone 314 gives a small response at top and bottom surrounded by flat spots "F1" 316 above and flat spot "F2" 318 below. This overall response, including the elements described, is used by the interpreter to judge validity of the hydrocarbon indication. These features are used to predict a drill site location along with the depth required to reach the zones of interest. An interpreter is typically faced with geologic and man made spurious noise that distorts the perfect response, but the strength of these pay zone anomalies is usually strong enough to overcome the noise.

Figure 6:
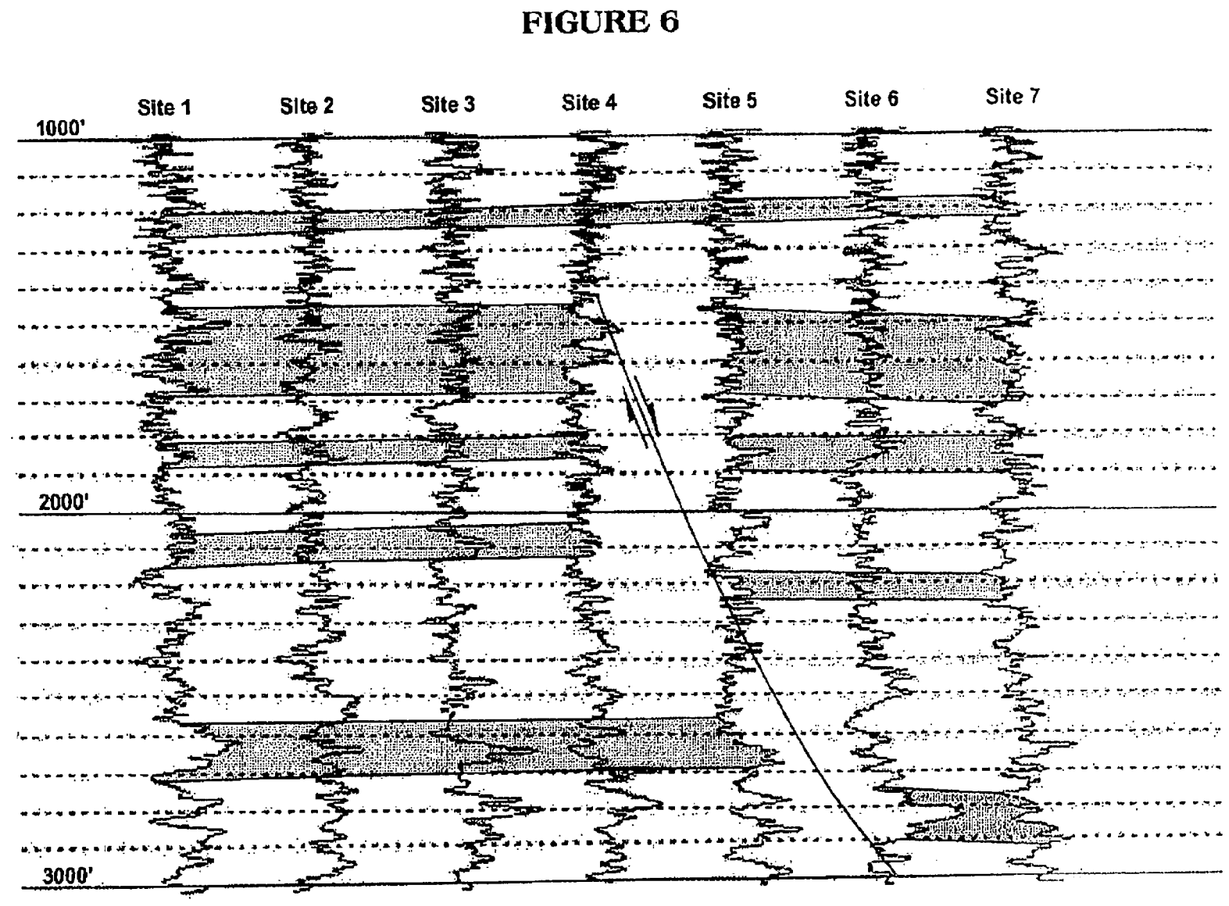
FIG. 6 is a cross section made from data recorded at seven sites. The sites are located in a straight line and are spaced equally apart.

An additional step 320 may be added to extend the use of the embodiment described above. Multiple site locations on a profile or grid may be used for additional structural and stratigraphic mapping. After obtaining the power spectrum plots from all the locations on the grid, they may be plotted together to generate a 3D subsurface profiles. An example of a 2-D profile is shown in FIG. 6.

The methods of the present invention are to produce a plot of amplitude and depth in a form whereby a hydrocarbon reservoir is depicted with a characteristic signature. The characteristic signature is obtained by processing the measured data either in the TIME-DOMAIN or the FREQUENCY-DOMAIN. In either case, the final plot is made by comparing a filtered file with an unfiltered file close to the predicted depth of the reservoir. Trial and error calculations moving the depth up or down in small increments tests the reservoir for a hydrocarbon response. In the optimum case, the response from the top of the reservoir interacts with the response from the bottom of the reservoir to make an interference pattern. This pattern, when plotted against depth, covers a depth range larger than the thickness of the reservoir. The pattern consists of components including large broad amplitudes above and below with sharp amplitudes at the top and bottom of the reservoir separated by minimum amplitudes as shown in FIG. 3.

In the above embodiments, data are collected in time domain, i.e. amplitude-time data are collected by field measurement. In another embodiment, it is also possible to collect frequency domain data directly, skipping the conversion process. In this embodiment, the receiver has a tuner which can be tuned to frequencies within a wide band. The tuner is tuned to frequencies that are multiples of the quarter harmonics of power line frequencies, which are 15 Hz in the US and other countries with 60 Hz base frequency and 12.5 Hz in many other parts of the world with a base frequency of 50 Hz. The amplitude-frequency data can be stacked to reduce spurious noise. The data can be digitized to facilitate further processing. The amplitude-frequency data can then be used in the same way as the power spectrum converted from time-domain data in the embodiments discussed earlier.

Figure 4:
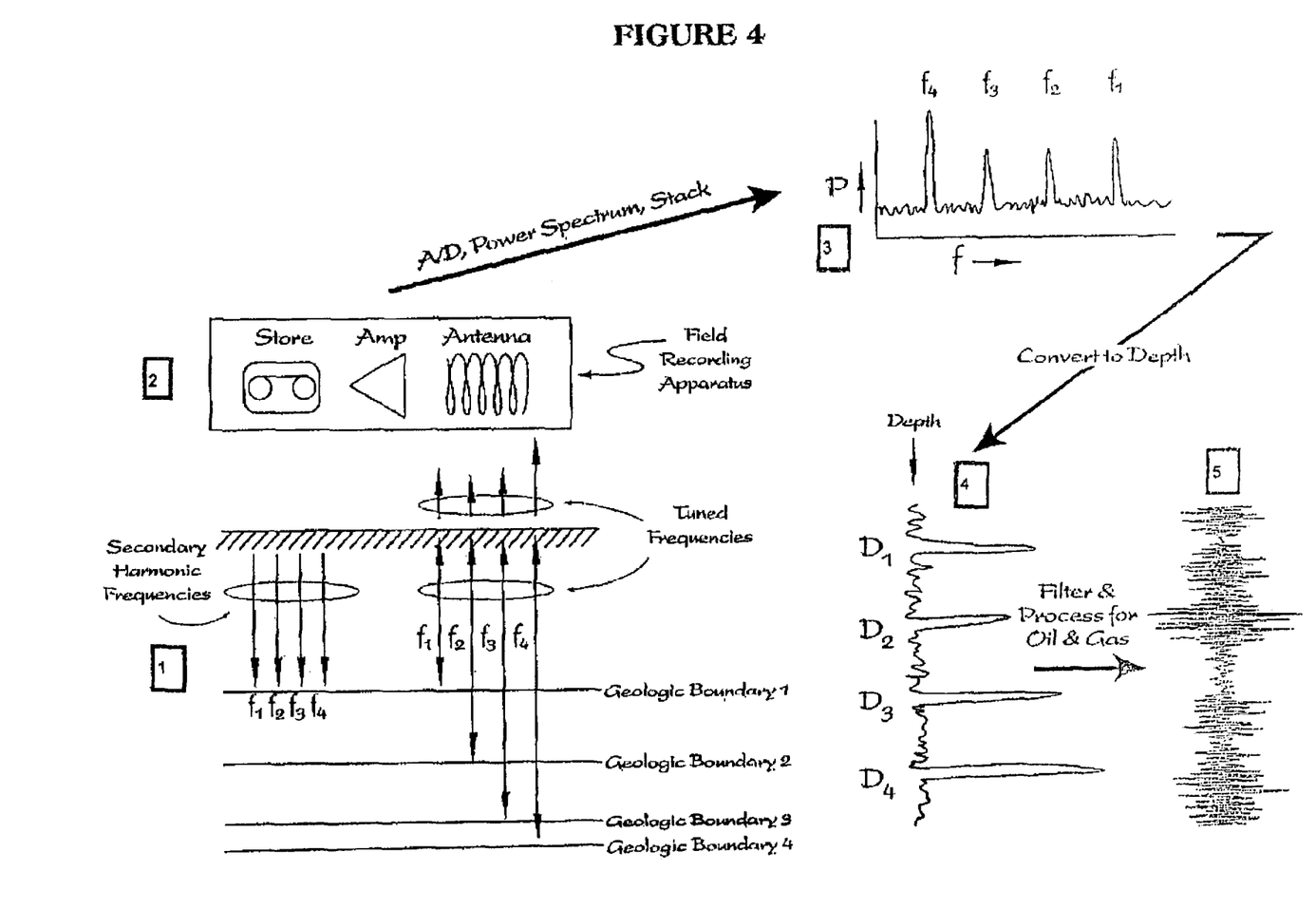
FIG. 4 is a schematic that depicts the entire process from data acquisition through final presentation.

FIG. 4 depicts a summary of the steps 1-5 described above in FIGS. 2 and 3, starting with the source and the responses from subsurface boundaries. FIG. 4 summarizes the steps to reach a final product. The final product typically produces two plots 4 and 5. The derivative plot 5, interpreted according to the teachings defined in FIG. 3, is used to predict the presence or absence of hydrocarbon zones. The power spectrum plotted against depth is primarily used to interpret geologic structure and stratigraphy.

Figure 5:
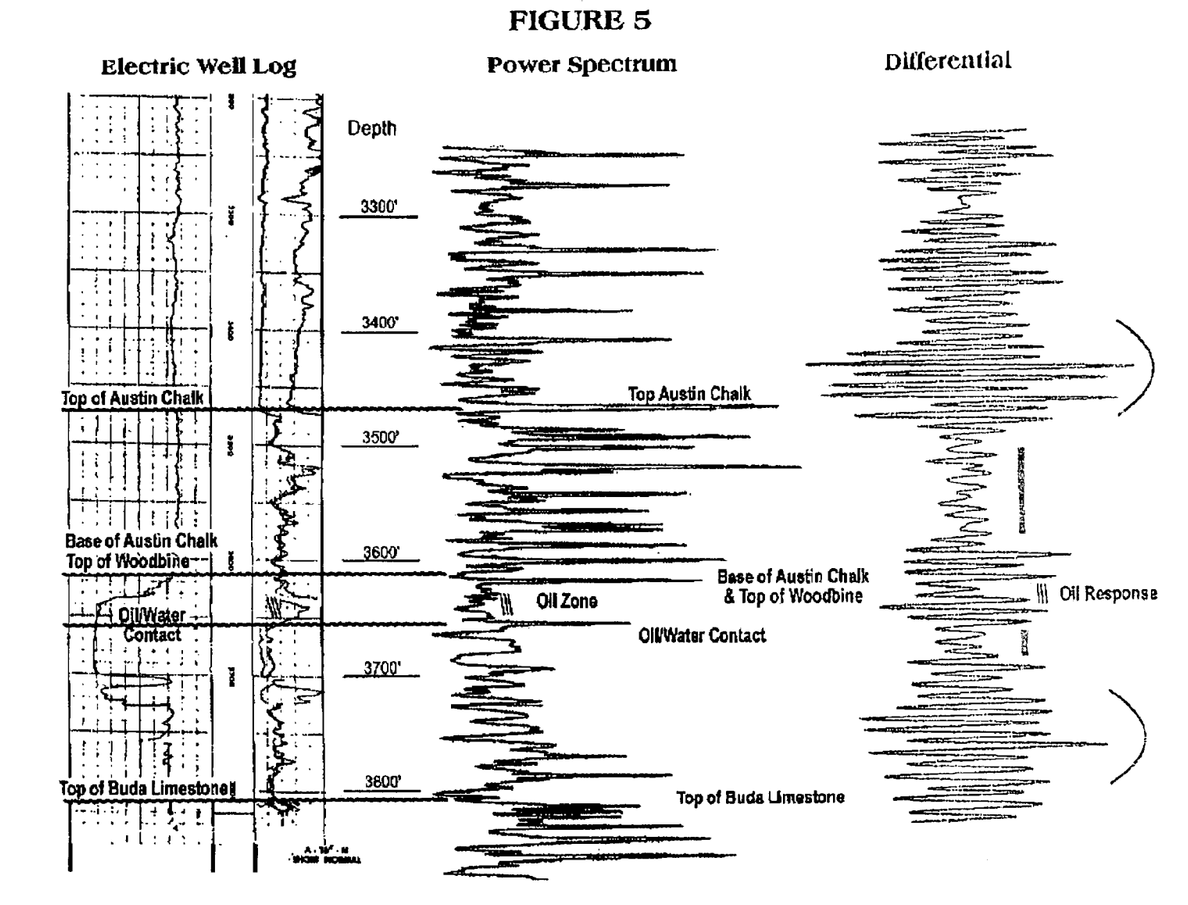
FIG. 5 is a presentation of an actual interpretation that has been made at a known site. Also included is a well log that was obtained at the same site.

FIG. 5 is an actual data example that plots the data collected and processed by an embodiment of the current invention beside an electric well log from a drill hole at the measurement site. The electric well log shows the subsurface geological layers at the site. The top of Austin Chalk (at 3470 ft), the base of Austin Chalk (at 3610 ft), oil zone (at 3610 ft), oil/water contact (at 3655 ft) are shown. The power spectrum in the middle of FIG. 5 shows the subsurface layers. Each large spike indicates a subsurface stratigraphic change, or the boundary of major geological feature, such as the top and bottom of the Austin Chalk. The differential chart on the right in FIG. 5 shows the presence or absence of hydrocarbon deposit and its depth if it is present. According to the differential chart in FIG. 5, the oil zone is at 3610 ft to 3650 ft. The differential chart in this case predicts the oil zone within about 5 ft resolution at 3600 ft depth. Its accuracy in predicting hydrocarbon deposit according to the methods in current invention is typically better than 25 ft, depending on the depth of the deposit.

FIG. 6 is an example of cross sections of multiple sites. The power spectrum of each site plotted against the depth as predicted using formula 3 makes a cross section for additional geologic interpretations. Using the same form factors, power spectrums at points in a grid can be easily and economically obtained. The aggregation of all grid point of the site can be used to interpret the geology in the third dimension. Using a combination of the electric well log from a single drilled well and the methods of the current invention, one can obtain an accurate subsurface geological interpretation of a large area. Without the benefit of the current invention such results may traditionally require many drilled wells and costly seismic measurement and processing. The shaded areas in FIG. 6 show the continuation of subsurface structure from one site to another. They also show the movement of boundaries.

The primary advantage of the present invention, as compared to other prior art methods that can be used to investigate the subsurface of the earth, is the substantial reduction in effort required to obtain high-resolution subsurface information. This in turn translates into very large cost reductions. The use of a free and omnipresent electromagnetic source greatly simplifies data acquisition. The power line grid, and the secondary harmonics that are induced into the earth, are universally present and reasonably constant in amplitude. This source provides an abundance of known frequencies each of which has the opportunity to tune with a subsurface boundary. The information obtained by processing these various frequencies results in a high resolution of boundary depths and direct indications of the existence of many resources, such as hydrocarbon, water or other minerals.

While illustrative embodiments of the invention have been illustrated and described, it will be appreciated that various changes can be made therein without departing from the spirit and scope of the invention.

We claim:

1. A method of geological prospecting, comprising:
   (a) detecting a plurality of electromagnetic waves in the earth, wherein the plurality of electromagnetic waves are:
       induced in the earth by a power grid;
       in resonance with geological boundaries within the earth; and
       multiples of sub-harmonics of a power grid frequency; and
   (b) for one or more of the plurality of electromagnetic waves generating a base plot of amplitude vs. depth using the formula: $d=(k/f)+b$, where d is the depth in feet, f is the frequency in Hz, and k is a constant dependant on a phase velocity of the electromagnetic wave and b is a calibration constant and generating a differential plot of amplitude v. depth wherein the relationship between the base plot and the differential plot is indicative of the presence of a geological feature.

2. The method in claim 1, wherein the geological features is selected from a group of hydrocarbon, water, salt and minerals.

3. The method in claim 1, wherein k and b are determined empirically at a site for prospecting, and wherein k is in the range between $10\times10^6$ to $35\times10^6$, b is in the range of −500 to 500.

4. The method in claim 1, further including determining a frequency of each of the plurality of electromagnetic waves which includes:
   collecting time-amplitude data from signals received by an antenna for a time period;
   converting the time-amplitude data into frequency-amplitude data by a conversion method.

5. The method in claim 4, wherein the conversion method is FFT, MEM or WAVELET.

6. The method in claim 5, wherein the conversion method is MEM,
   wherein one base power spectrum is converted with n coefficients; and
   wherein at least one secondary power spectrum is converted with m coefficients where m is less than n.

7. The method in claim 6, wherein the time-amplitude data has l data points;
   wherein n is less than half of l and greater than 1/8 of l; and
   wherein m is less than n and greater than 1/3 of n.

* * * * *